United States Patent
Eberlein et al.

(10) Patent No.: US 12,120,042 B2
(45) Date of Patent: Oct. 15, 2024

(54) HOLISTIC MEASUREMENT OF MICROSERVICE-BASED APPLICATION RESOURCE CONSUMPTION

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 18/064,453

(22) Filed: Dec. 12, 2022

(65) Prior Publication Data
US 2024/0195752 A1    Jun. 13, 2024

(51) Int. Cl.
*H04L 47/70* (2022.01)
*H04L 47/80* (2022.01)

(52) U.S. Cl.
CPC .......... *H04L 47/822* (2013.01); *H04L 47/803* (2013.01); *H04L 47/827* (2013.01)

(58) Field of Classification Search
CPC .... H04L 47/822; H04L 47/803; H04L 47/827
See application file for complete search history.

(56) References Cited

U.S. PATENT DOCUMENTS

| | | |
|---|---|---|
| 2016/0212064 A1 | 7/2016 | Biswas et al. |
| 2019/0158300 A1 | 5/2019 | Sabella et al. |
| 2022/0038554 A1 * | 2/2022 | Merwaday .............. H04L 45/64 |
| 2022/0075759 A1 * | 3/2022 | Golway ................ G06F 16/273 |
| 2022/0385489 A1 * | 12/2022 | Kothuri ................. H04M 15/44 |

OTHER PUBLICATIONS

Communication: "Extended European Search Report", Dec. 12, 2023 (Dec. 12, 2023), European Patent Office, for European Application No. 23193163.5-1203, 10 pages.
Amazon: "AWS Lambda—Pricing", May 1, 2019 (May 1, 2019), XP093106027, retrieved from the Internet: URL:https://web.archieve.org/web/20190501054509/https://aws.amazon.com/lambda/pricing/ [retrieved on Nov. 27, 2023], (pp. 1-10, 10 total pages).

* cited by examiner

*Primary Examiner* — Farzana B Huq
(74) *Attorney, Agent, or Firm* — Buckley, Maschoff & Talwalkar LLC (57) ABSTRACT

Systems and methods include reception of a first service call from a first service at a second service, generation, at the second service, of a response to the first service call, determination, at the second service, of an amount of hardware resources consumed by the second service during generation of the response to the first service call, generation, at the second service, of a first resource consumption token identifying the amount of hardware resources consumed by the second service during generation of the response to the first service call, determination of a first identifier of a type of hardware on which the second service is executing, and return of the response, the first resource consumption token and the first identifier of the type of hardware to the first service.

17 Claims, 7 Drawing Sheets

| Service | CPU [ms] / Network-in [Mb] / Network-out [Mb] / inter-region / inter-network | RTM |
|---|---|---|
| 130 | 140 / 36 / 10 / US-EU / internal-internal | CPU-S-EU |
| 140 | 16 / 36 / 10 / EU-EU / internal-internal<br>10 / 5 / 800 / EU-EU / internal-internal | CPU-S-EU |
| 150 | 1600 / 600 / 1 / EU-EU / internal-internal<br>4500 / 1300 / 1 / EU-EU / internal-internal<br>400 / 200 / 1 / EU-EU / internal-internal | CPU-L-EU |

HOLISTIC MEASUREMENT OF MICROSERVICE-BASED APPLICATION RESOURCE CONSUMPTION

BACKGROUND

Conventional three-tier (i.e., client-application-server) on-premise computing systems are sized to provide a desired performance level to an expected number of parallel users. Typically, such systems include a database of a static size intended to serve peak usage and may also include scale-out application servers to provide limited elasticity. Hardware costs are therefore fixed once those servers have been acquired and a price per user can be determined from the costs of running the database, the static application server instances and any dynamically-assigned additional application server instances. The actual degree of hardware resource usage has no relevant impact on the total operational cost (except for slight changes in power consumption due to high/low usage).

Modern organizations are increasingly using system landscapes consisting of computing services provided by a plurality of geographically-distant and cloud-based computing systems. For example, an organization may deploy an application as a set of services executed by respective servers located within data centers provided by one or more infrastructure as-a-service (IaaS) providers. A system landscape may also include services provided by third parties such as, for example, payment services and logistics services. The above-described traditional cost analysis does not apply to such microservice architectures, where infrastructure resources are purchased from an IaaS provider on a pay-per-use model, serverless functions are used, and machine learning models are trained using specialized hardware on demand.

Under a pay-per-use model, actual costs per user request, overhead costs, and the cost contribution of single services to a bundled offering are difficult to determine. Moreover, the contribution of individual services to an application consisting of many services is problematic, particularly in a case that one or more of the services is used by several independently-consumable applications.

A conventional approach is to have each service estimate its price by translating its own resource consumption-based cost to another metric such as price per service request. The translation is based on a cost model which cost model de-couples an actual cost to be paid for resource consumption from a cost charged (internally) for service consumption. The cost model is an approximation that is intrinsically accompanied by an error. For example, call scenarios to re-use services are typically similar per application but are not statically distributed evenly between different applications. Such systematic errors accumulate rather than average out as in the case of statistical errors. For an application using a large number of services (with a partly unknown usage contribution) and in which each service uses other services, the accumulated error can be quite large.

Conventional systems do not facilitate identification of the origin of high costs. For example, two services S1 and S2 call a document rendering service which charges per document, with S1 sending big files and S2 sending small files. The costs of the rendering service are averaged between S1 and S2, even if the calls by S1 generate higher resource usage than those of S2 and thus contribute more to the overall costs experienced by the rendering service. As a result, it appears that S1 and S2 incur the same resource costs, but in fact they do not.

Systems are desired for efficiently determining actual resource consumption of a microservice-based application.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments allow measurement of resource consumption for each service call generated by an incoming user request and derivation of consumption-related usage costs therefrom. Embodiments may further determine shared costs based on actual resource utilization and include such shared costs into the derived consumption-related usage costs.

Briefly, a called service determines its own resource consumption resulting from an incoming service call and generates a resource consumption token (RCT) indicating the resource consumption. The RCT is passed back to the caller service, which an enriched RCT returns to its own caller service which further indicates its own resource consumption. A service may aggregate RCTs which relate to the same hardware and same types of network traffic. An RCT generated by a called service may also include actual costs of third-party services which may have been consumed by the called service.

Costs of an incoming user request are determined based on the last-created RCT corresponding to the user request and on cost models of the hardware systems identified in the RCT. By mapping incoming user requests to specific tenants (e.g., customers), all RCTs associated with a particular tenant may be determined and a customer-specific total cost derived therefrom. Some embodiments prevent accumulated errors in cost collection caused by abstracting and averaging on each service level, thereby facilitating more profitable and competitive pricing and further cost optimization.

Figure 1:
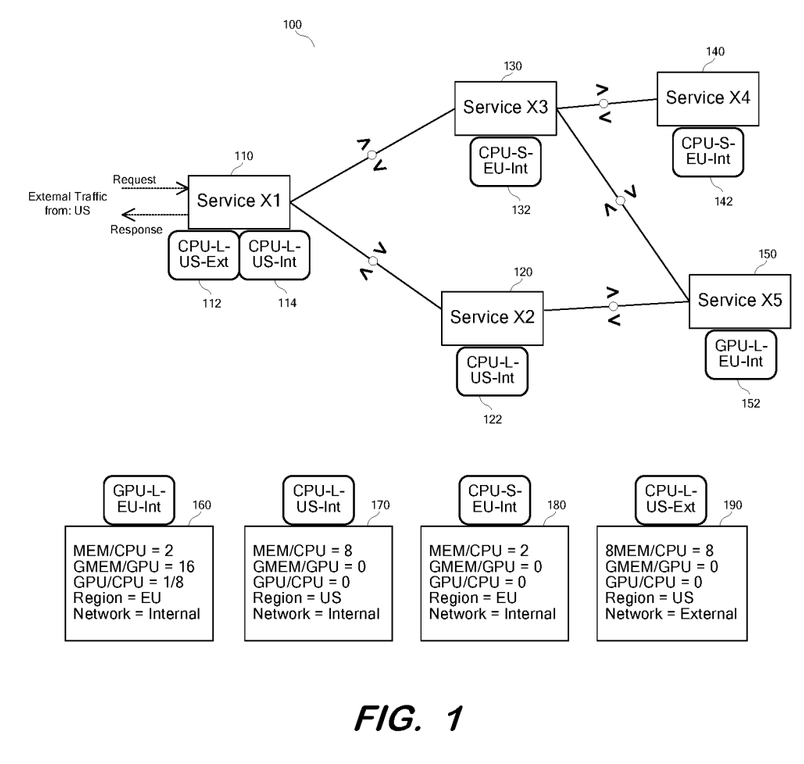
FIG. 1 is a block diagram of a mesh of services of a microservice-based application executing on disparate servers according to some embodiments.

FIG. 1 is a block diagram of mesh 100 of services 110, 120, 130, 140 and 150 of a microservice-based application according to some embodiments. Service 110 receives a request associated with the application from an external user (e.g., operating a Web browser). In response, service 110 calls services 120 and 130, service 120 calls service 150 and, service 130 calls services 140 and 150. Service 120 receives a response from service 150 and provides a response to service 110. Service 130 receives responses from services 140 and 150 and provides a response to service 110. Service 110 then returns a response to the external user.

Services 110, 120, 130, 140 and 150 may communicate with one another according to Web communication protocols (e.g., HTTP), but embodiments are not limited thereto. As described above, one or more of services 110, 120, 130, 140 and 150 may be used by other microservice-based applications in combination with other unshown services.

Services 110, 120, 130, 140 and 150 of mesh 100 comprise executable program code executed by disparate servers, each of which may comprise any combination of computing systems interconnected in any known manner. One or more of the computing systems may comprise blade servers located in the same datacenter. Two or more of the computing systems may be provided by different IaaS providers. A computing system according to some embodiments may comprise an on-premise server, a cloud-deployed virtual machine, or any other suitable computing system to execute a software-based service as described herein. A cloud-based service according to some embodiments may be deployed on a computing system which apportions computing resources elastically according to demand, need, price, and/or any other metric.

Each service of FIG. 1 is depicted in conjunction with one or more computer servers on which the service executes. In particular, service 110 executes on servers 112 and 114, service 120 executes on server 122, service 130 executes on server 132, service 140 executes on server 142, and service 150 executes on server 152. Execution of each service consumes resources (e.g., CPU time, memory, network bandwidth) of the one or more computer servers on which the service executes.

The servers of FIG. 1 are labeled based on their resource type. Servers having the same hardware configuration may be associated with the same resource type, but embodiments are not limited thereto. For example, two identical servers may be associated with different resource types if the resource costs to be associated with each server differ. In the present example, server 112 is associated with resource type CPU-L-US-Ext, servers 114 and 122 are associated with resource type CPU-L-US-Int, servers 132 and 142 are associated with resource type CPU-S-EU-Int, and service 152 is associated with resource type GPU-L-EU-Int.

FIG. 1 associates each resource type with a resource type manifest (RTM) 160-190. Each RTM 160-190 may be associated with a specific cost model exposed by an IaaS provider. In one example, an IaaS provider may offer various servers with a fixed ratio of CPU cores/RAM (Gb) of ½ at a certain price per hour. All servers exhibiting this ratio may be assigned to the same RTM since they all are charged to users using the same cost model. In some embodiments, resource consumption costs differ by region, so two identical servers in different regions may be associated with different RTMs.

Thus, the actual costs for an individual request to the application can be determined from the resource usage of each service in response to the request, the resource type of the server on which each service executes, and the cost models of the resource types. Server idle costs can also be accounted for as will be described below by including average resource utilization over a past period within the resource usage information.

Figure 2:
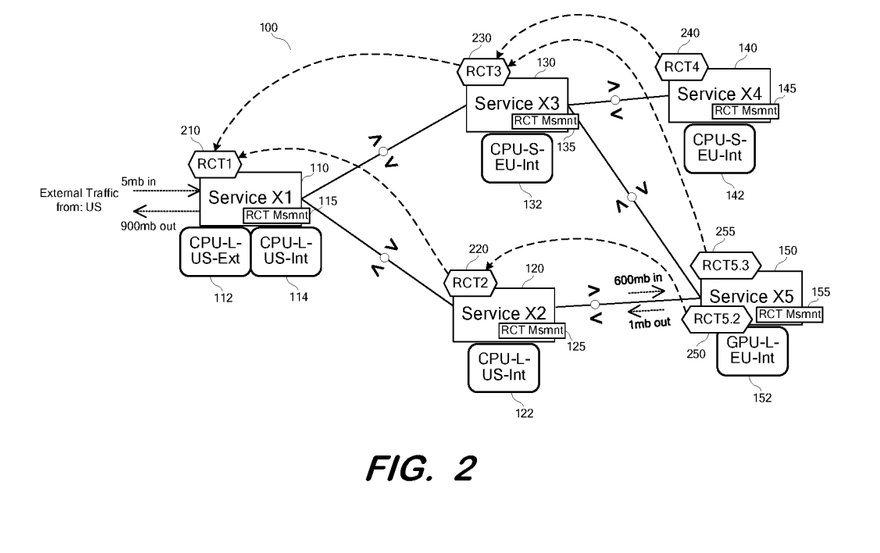
FIG. 2 illustrates generation of resource consumption tokens by services in response to an incoming application request according to some embodiments.

FIG. 2 illustrates generation of RCTs in response to an incoming request to a microservice-based application according to some embodiments. As mentioned above, each service determines amounts of its own resources consumed in response to a service call and populates an RCT therewith. The consumed resources determined by a service and included in an RCT need only include those resources for which the IaaS provider intends to charge usage fees. For example, in the case of storage resources, an RCT may only include a number of bytes stored by a service, and not the CPU usage of the storage system.

Each of services 110, 120, 130, 140 and 150 of FIG. 2 includes RCT management component 115, 125, 135, 145 and 155, respectively. A service may use an RCT management component to determine amounts of local resources consumed in response to a service call and to populate a corresponding RCT therewith. According to some embodiments, a service may also use an RCT management component to aggregate determined and/or received resource consumption data and populate an RCT with the aggregated data as described below. An RCT management component may comprise a reusable library or other suitable technology.

In the present example, each service determines the resources it used to execute a service call, generates an RCT based thereon, and returns the RCT to its caller service. If the called service in turn calls another service, the generated RCT also includes an RCT received from the other called service. For example, service 130 calls service 140 and service 150. Services 140 and 150 generate respective RCT4 240 and RCT5.3 255 including resources consumed during execution of the service call from service 130 and return RCT4 240 and RCT5.3 255 to service 130 (e.g., as an HTTP response header). Service 130 determines the resources consumed during its own execution and generates RCT3 230 including the determined resources and the resources specified in RCT4 240 and RCT5.3 255.

Figure 3:
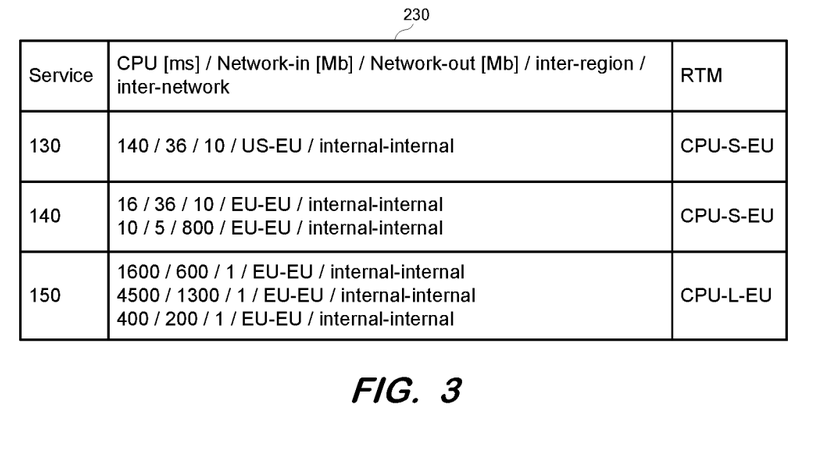
FIG. 3 is a tabular representation of resource consumption tokens collected by a service during response to an incoming application request according to some embodiments.

In some examples, service 130 calls service 150 three times in response to a single incoming user request, and each call results in an RCT5.3 255 returned from service 150. Similarly, service 130 calls service 140 twice in response to a single incoming user request, and each call results in an RCT4 240 returned from service 140. FIG. 3 is a tabular portion of RCT3 230 which may be generated by service 130 in such an example.

When generating RCT3 230, service 130 may aggregate the resource consumption specified in each returned RCT5.3 255 and in each returned RCT4 240. This resource consumption may be aggregated because each returned RCT5.3 255 is associated with the same resource type (i.e., GPU-L-EU-Int) and therefore with the same RTM.

RCTs associated with different RTMs are not summed because different resource types are associated with different cost models. An RCT may therefore contain a list of resource consumptions, where each is associated with a unique (i.e., within the RCT) RTM. In some embodiments, and to reduce potential sizes of the RCTs, any resource consumptions associated with the same RTM are summed, regardless of whether one or more services consumed the resources. In the given example, since services 230 and 240 are associated with the same RTM, service 230 may generate RCT3 240 so as to include a sum of its own resource consumptions with those from RCT4 240 generated by service 140. The summed RCT5.3s 255 resulting from the multiple calls to service 150 are included in RCT3 240 separately from the sum of RCT3 240 and RCT4 240 because service 150 is associated with a different RTM.

Similarly, service 110 may aggregate its own resource consumption with the resource consumption of RCT2 220 which is associated with resource type CPU-L-US-Int, since service 110 is associated with the same resource type. Once service 110 receives RCT3 230 from service 130, the resource consumption indicated therein is appended to the aggregated resource consumption to generate RCT1 210. Consequently, all resource consumptions are recursively aggregated within RCT1 210 and a total cost of the incoming request can be calculated based on RCT1 210 and on the cost models associated with each RTM referenced therein.

Unlike the aggregation of CPU resource consumptions, network resource consumptions included in RCTs are aggregated only if they are associated with the same RTM, the same traffic direction (i.e., inbound or outbound), between the same types of networks (i.e., internal or external), and between the same geographical regions. If not, the network resource consumptions are included as separate network resource consumption entries.

Network resource consumption on the caller side is included in the RCT of the service making the call. Inclusion of the network resource consumption in the RCT can only be performed once the called service returns, since the region information included in the RTM of the called service is needed (along with region information included in the RTM of the caller service) to determine if the call was within or across regions (or availability zones, datacenters, etc., depending on the attributes relevant for charges billed by the IaaS provider). Also, the RTM of the called service and the corresponding RTM of the caller service are used to determine whether the network traffic travelled over an internal or external network.

More generally, a service call may cause the caller service to determine, for inclusion in an RCT: outbound traffic bytes sent, within or across regions, to internal or external network; and inbound traffic bytes received, within or across regions, from internal or external network. Similarly, the service call may cause the called service to determine, for inclusion in its RCT: inbound traffic bytes received, within or across regions, from internal or external network; and outbound traffic bytes sent, within or across regions, to internal or external network.

In the present example, service 110 makes calls to services 120 and 130. Service 120 is executed in the same region as service 110 and service 130 is in a different region, but both services 120 and 130 are accessed via an internal network. In contrast, service 110 itself is called from an external network, therefore it references two RTMs in its RCT. The first referenced RTM corresponds to the network resource consumption of the communication with a user via the external network and the second referenced RTN corresponds to the communication with services 120 and 130 via the internal network. Furthermore, the network resource consumption referencing the RTM for the internal network is associated with two different traffic types, one for communication within a region (i.e., to service 120) and one for communication across regions (i.e., to service 130).

The foregoing features are compatible with IaaS providers which charge for network traffic on both the sending and receiving side, potentially at different prices. For example, inbound internet traffic may be free, whereas outbound internet traffic is charged. Moreover, internal traffic may be charged in both directions, but at different price points if it is within a region versus across regions.

Network resource consumption of a service can be measured relatively easily by evaluating the size of received or sent messages. Measurement of CPU consumption, on the other hand, is not always trivial. Certain runtime environments provide APIs to measure the CPU time consumed by a thread (e.g., the ThreadMXBean interface in Java) between reception of a request and return of a response. An RCT management component used by a service as described herein may utilize such APIs to measure CPU consumption. If a service switches threads or parallelizes work by running multiple threads in parallel, all CPU time consumed by the various threads should be measured and aggregated within the RCT.

Figure 4:
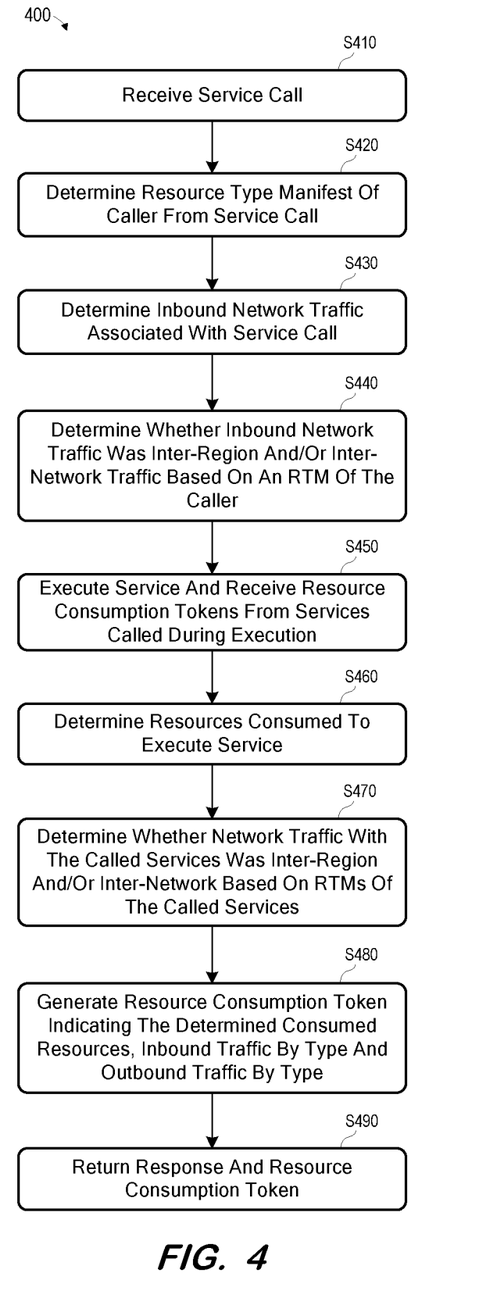
FIG. 4 comprises a flow diagram of a process to generate a resource consumption token in response to a service call according to some embodiments.

FIG. 4 comprises a flow diagram of process 400 to generate an RCT at a called service according to some embodiments. Process 400 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A service call is received at a service at S410. The service call may comprise an external call from a Web browser such as that received by service 110 of mesh 100. The received service call may be received from another service during execution of a microservice-based application as also described above.

An RTM associated with the caller is determined at S420 based on the service call. In some embodiments, a caller service includes an RTM of its hardware in the header of its outbound service calls, which may comprise HTTP requests. Next, at S430, an amount of inbound network traffic associated with the service call is determined. The amount of inbound network traffic (in bytes, for example) may be determined from the network hardware on which the service executes.

Based on the RTM of the caller, it is determined whether the inbound traffic was inter-region and/or inter-network at S440. For example, it may be determined based on the RTM of the called service that the called service is in the US and on an internal network. If the RTM of the caller indicates that the caller is in the US and on an internal network, then the inbound traffic is determined to not be inter-region nor inter-network. If the RTM of the caller indicates that the caller is in the EU and on an internal network, then the inbound traffic is determined to be inter-region and not nor inter-network.

At S450, the called service executes in response to the call. During such execution and as described above, the called service may call one or more other services one or more times and receive responses to each call. Included with each response (e.g., in an HTTP header) is a resource consumption token generated by the called service.

At S460, the computing resources which were consumed to execute the service in response to the call are determined. The computing resources of interest at S460 are those of the hardware which executes the service. For example, an amount of CPU time, an amount of memory storage, etc. used by the service are determined at S460.

For the inbound and outbound network traffic exchanged with the services called during execution of the service, it is determined whether the traffic was inter-region and/or inter-network at S470. This determination may be based on comparisons between the RTMs of the called services and the RTM of the present (i.e., caller) service as described above.

A resource consumption token is generated at S480. The resource consumption token indicates the consumed resources determined at S460, the inbound traffic determined at S430 and S470, and the outbound traffic determined at S470. Indications of the inbound traffic and outbound traffic may be separated by type (e.g., inter-region and inter-network, intra-region and intra-network, intra-region and inter-network, and inter-region and intra-network.

Also included in the resource consumption token generated at S480 may be other resource consumption tokens received from any services called at S450. As described above, resource consumption information of these tokens may be aggregated together and/or with the resource consumption information determined at S460 depending on the RTM associated with each resource consumption token. Network resource consumption may be aggregated in some embodiments only if it is associated with the same RTM, traffic direction, sender and receiver network type, and sender and receiver regions.

A response to the call received at S410 is returned at S490. The response includes the resource consumption token generated at S480. As noted, the resource consumption token generated at S480 may include other resource consumption tokens received at S450.

Figure 5:
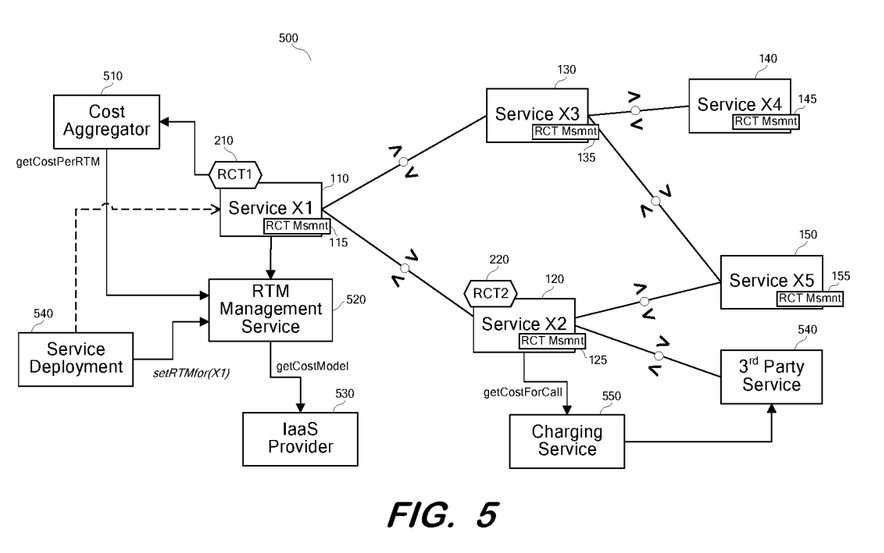
FIG. 5 is a block diagram of an architecture to determine costs based on resource consumption tokens generated by a mesh of services according to some embodiments.

If the called service was the entry point of an incoming user request, the returned resource consumption token may be used to determine a total cost associated with request. FIG. 5 illustrates architecture 500 to determine costs based on the RCTs and RTMs described herein. Architecture 500 is similar to that shown in FIG. 2 but for the addition of cost aggregator 510, RTM management service 520, IaaS provider 530, service deployment 540, $3^{rd}$ party service 540 and charging service 550. Each of components 510-550 may be implemented using any combination of hardware and software that is or becomes known.

$3^{rd}$ party service 540 may comprise a service with a pay-per-call billing model. It may be assumed that service 540 is not under control of the provider of services 110, 120, 130, 140 and 150 and cannot be instrumented to generate RCTs as described herein. In order to determine a cost for calls to service 540, and because service 540 will likely not return its resource consumption nor costs in response to a call, charging service 550 provides an interface to calling services for acquiring the cost model (e.g., cost per call) for service 540. Accordingly, in the present example, service 120 may query charging service 550 to determine the monetary cost of its calls to service 540 and include that cost in its generated RCT2 220.

Figure 6:
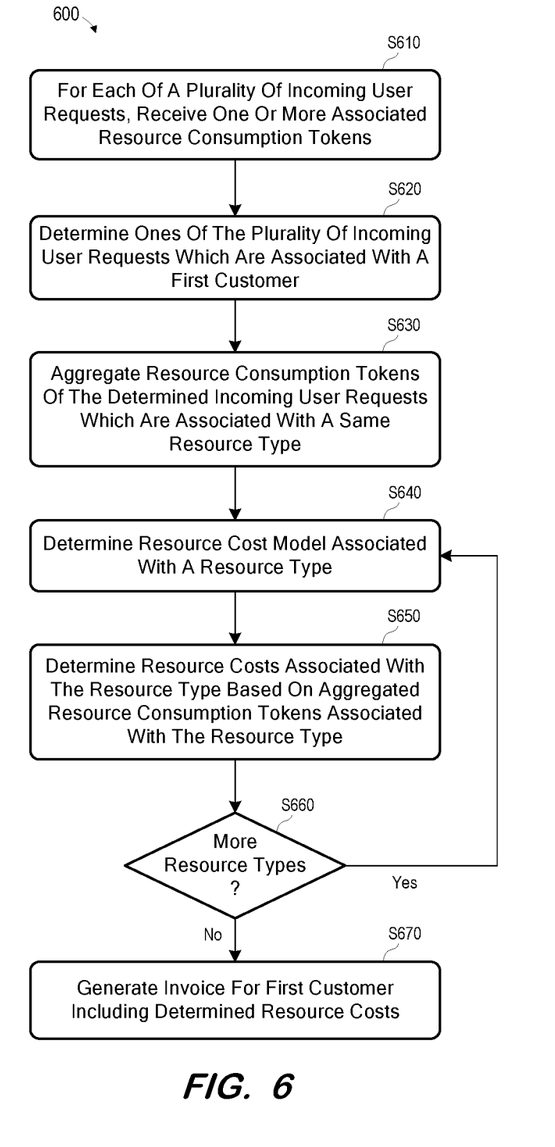
FIG. 6 comprises a flow diagram of a process to determine costs based on resource consumption tokens generated by a mesh of services according to some embodiments.

FIG. 6 comprises a flow diagram of process 600 to determine costs based on resource consumption tokens generated by a mesh of services according to some embodiments. Process 600 may be performed by cost aggregator 510, but embodiments are not limited thereto.

Initially, at S610, one or more resource consumption tokens for each of a plurality of incoming user requests to an application are received. For example, a user request to an application may be received from a Web browser by service 110. This user request may cause services 110, 120, 130, 140 and 150 to generate RCTs as described above, all of which are associated with the user request. Cost aggregator 510 may receive RCT1 210 including these generated RCTs (some of which may have been aggregated as described above) at S620. RCTs generated in response to many other incoming user requests to the application are also received at S610.

At S620, ones of the plurality of incoming requests which are associated with a first customer are determined. Accordingly, process 600 may be executed to determine resource costs associated with a first customer, or tenant. The first customer may be associated with a set of users who are permitted to access the application. In some embodiments, each incoming request is accompanied by an identifier of the requesting user. S620 may therefore include determination of incoming requests received from users who are associated with the first customer. According to some embodiments, an authorization token issued after user authentication identifies both the requesting user and the customer, and service 110 provides the token as well as RCT1 210 to cost aggregator 510 for each received request.

The resource consumption tokens of the user requests associated with the first customer are aggregated at S630. The aggregation is intended to determine a single value per resource type for each consumed and separately-billed resource. As described above, the CPU usage and memory usage information of RCTs associated with the same RTM may simply be summed at S630. However, network resource usage values associated with the same RTM are summed at S630 only if the values refer to a same traffic direction, a same sender network type and receiver network type, and a same sender region and receiver region. The foregoing assumes that a cost model of the RTM attributes different costs to the thusly-represented different types of network traffic.

Accordingly, after S630, each of one or more resource types is associated with a value representing an amount of consumption of each of several different resources (e.g., 5400 ms CPU time, 4 Gb memory, 1 MB inbound, internal-internal, US-US traffic, 105 MB outbound, internal-external, US-EU traffic, etc.). At S640, a resource cost model associated with a first one of the resource types is determined.

FIG. 5 illustrates a query from cost aggregator 510 to RTM management service 520 to acquire a resource cost model corresponding to an RTM. In turn, RTM management service 520 queries IaaS provider 530 of the RTM for an associated resource cost model and returns the cost model to cost aggregator 510. Also shown is service deployment component 540, which may deploy service 110 to a resource type and also inform service 520 of the RTM associated with service 110.

Resource costs associated with the resource type are determined at S650 based on the resource cost model and the aggregated RCTs. The resource cost model identifies a cost formula for each of the resources identified in the aggregated RCTs, and the formulas may simply be applied to the determined resource consumption amounts for the resource type to determine corresponding costs at S650.

Next, at S650, it is determined whether the aggregated RCTs include other resource types (i.e., RTMs). If so, flow returns to S640 and proceeds as described above to determine costs corresponding to a different resource type at S650. Flow proceeds from S660 to S670 once no more resource types remain to be processed.

At S670, an invoice is generated for the first customer. The invoice may include all the resource costs determined during each iteration of S650. These costs are intended to represent the costs of resource consumption by services of a micro-service application due to requests made to the application by users of the first customer. It should be noted that an invoice for another customer of the application may be similarly generated by determining ones of the plurality of incoming user requests which are associated with the other customer at S620 and proceeding as described above.

A service is said to run "serverless" if it starts on demand and terminates when complete. Such a serverless service does not consume hardware resources when it is not executing. However, since other services require some program code to be executed continuously on hardware provided by an IaaS provider, they will consume resources and thereby incur costs even when idle (i.e., not responding to calls).

In order to account for these idle costs, some embodiments include an average (e.g., moving) total resource utilization percentage over an immediate-prior period (e.g., one hour) in the RCTs generated by each service. For each service, the unused resource utilization may then be apportioned to customers in proportion to their total resource consumption.

Typically, an application consumes resources beyond what is consumed as a result of incoming user requests. This consumption may result from asynchronous activity such as document and data archiving, executing and storing backups, and data replication for analytics. These types of activities are scheduled for asynchronous execution, for example in batch processing, rather than on individual records processed by an individual call. It is therefore difficult to measure such resource consumption per call.

In some embodiments, a service collects the resource costs for such asynchronous activities over time and provides aggregated costs of the past and average cost per time interval (e.g., one hour). Consequently, a service can determine a cost per unit of activity (e.g., Mb, CPU cycle) which is most suitable for characterizing this type of asynchronous cost. The used share of these asynchronous costs can be added to the response returned to another service or user. In particular, the relative contribution of an asynchronous shared activity to an individual call can be determined by relating the characteristics of the call to the defined metric, e.g. "bytes written" by the service to "bytes archived" asynchronously or "objects created" by the service to "objects replicated to analytics" asynchronously.

Figure 7:
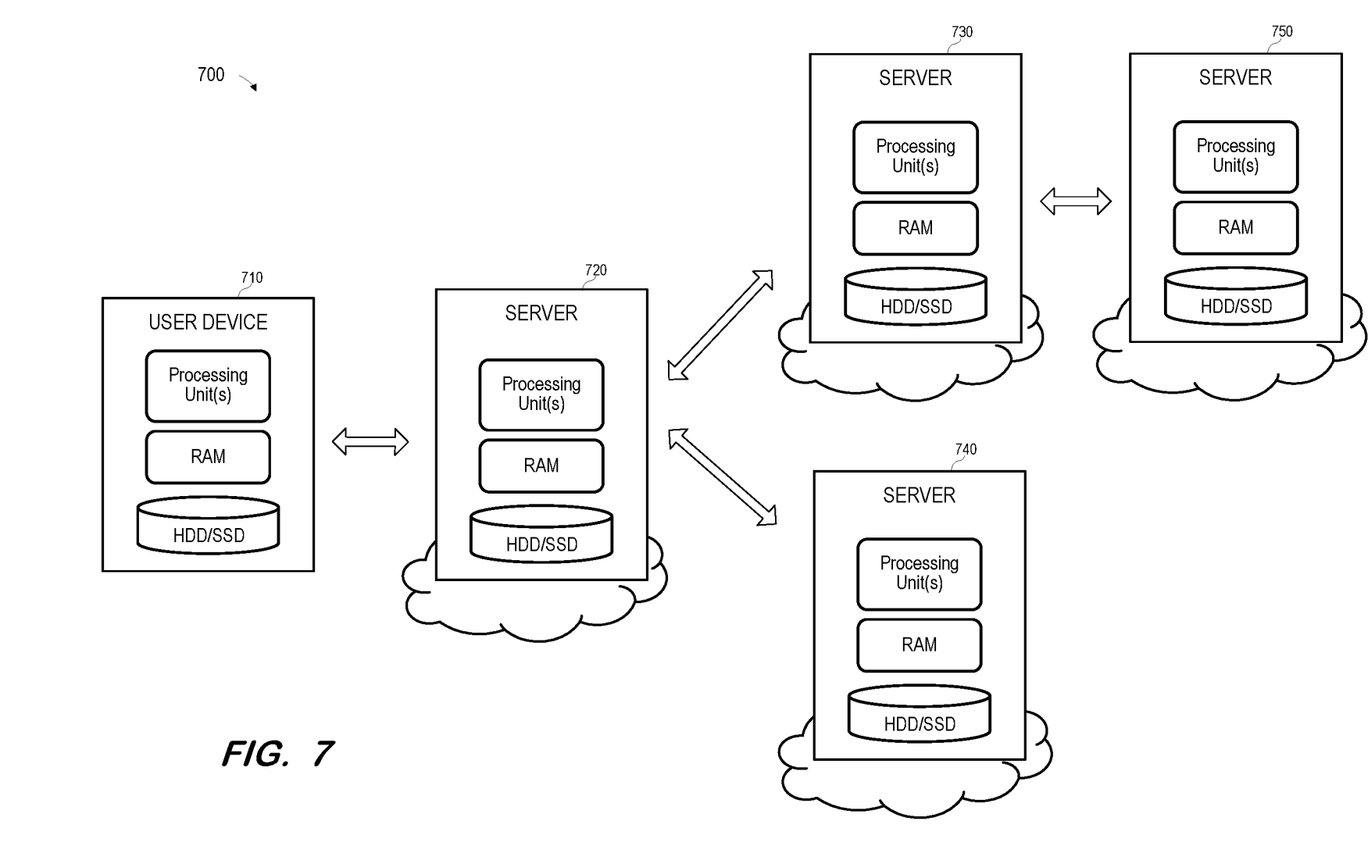
FIG. 7 is a block diagram of a cloud-based system landscape according to some embodiments.

FIG. 7 illustrates cloud-based database deployment 700 according to some embodiments. User device 710 may comprise any suitable computing system operable by a user to access a microservice-based application. User device 710 may store and execute program code of a Web browser to access a Uniform Resource Locator (URL) associated with a login page of such an application. The Web browser may download and execute program code of a client-side component of the application as is known in the art.

Servers 720-750 host services of the microservice-based application nodes 720. Each of servers 720-750 may comprise a separate physical machine or a virtual machine. Such virtual machines may be allocated by a cloud provider providing self-service and immediate provisioning, autoscaling, security, compliance and identity management features. Each of servers 720-750 is of a resource type associated with an RTM and a corresponding resource cost model as described herein.

In response to an incoming request from user device 710, servers 720-750 execute their respective services and issue service calls to one another to generate a response. Each service also generates an RCT in response to each received service call as described herein. An RCT generated by a service includes resource consumption data of the service and resource consumption data of all other RCTs received by the service during generation of a response to an incoming user request. The last-executing service therefore generates an RCT including all resource consumption data associated with an incoming user request. This RCT, along with RTMs of servers 720-750 and corresponding resource cost models, may be used to determine a cost associated with the incoming service request.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A method comprising:
receiving an incoming user request to an application, wherein the application comprises a first service and a second service;
in response to the incoming user request, transmitting a first service call from the first service to the second service;
generating, at the second service, a response to the first service call;
determining, at the second service, an amount of hardware resources consumed by the second service during generation of the response to the first service call;
determining an identifier of a type of hardware on which the second service is executing;
generating, at the second service, a first-resource consumption token identifying the amount of hardware resources consumed by the second service during generation of the response to the first service call and the identifier of the type of hardware on which the second service is executing;
returning the response to the first service call and the resource consumption token to the first service;
generating, at the first service, a response to the incoming user request to an application based on the response to the first service call;
determining, at the first service, an amount of hardware resources consumed by the first service during generation of the response to the incoming user request;
determining a second identifier of a type of hardware on which the first service is executing;
generating a second resource consumption token at the first service based on the resource consumption token, the second resource consumption token including the identifier and the second identifier, and identifying the amount of hardware resources consumed by the first service during generation of the response to the incoming user request and the amount of resources identified by the resource consumption token; and determining a resource cost associated with the incoming user request based on the second resource consumption token, a first cost model associated with the identifier of the type of hardware on which the second service is executing, and a second cost model associated with the second identifier of the type of hardware on which the first service is executing.

2. The method according to claim 1, wherein determining the resource cost comprises:
determining the first cost model; and
determining the second cost model.

3. The method according to claim 1, further comprising:
receiving a third service call from the second service at a third service;
generating, at the third service, a response to the third service call;
determining, at the third service, an amount of hardware resources consumed by the third service during generation of the response to the third service call;
determining a third identifier of a type of hardware on which the third service is executing;
generating, at the third service, a third resource consumption token identifying the third identifier and the amount of hardware resources consumed by the third service during generation of the response to the third service call;
and
returning the response to the third service call and the third resource consumption token to the second service,
wherein generation of the resource consumption token at the second service comprises determining that the identifier and the third identifier are identical, and, in response to the determination that the identifier and the third identifier are identical:
aggregating the amount of hardware resources consumed by the second service during generation of the response to the first service call with the amount of hardware resources consumed by the third service during generation of the response to the third service call,
wherein the resource consumption token identifies the aggregated amounts of hardware resources.

4. The method according to claim 3, wherein determining the resource cost comprises:
determining the first cost model; and
determining the second cost model.

5. The method according to claim 4, wherein generation of the resource consumption token at the second service comprises determining that the identifier and the third identifier are identical and that the hardware on which the second service and the third service are running are located in a same region.

6. The method according to claim 5, wherein generation of the resource consumption token at the second service comprises determining that the identifier and the third identifier are identical, that the hardware on which the second service and the third service are running are located in a same region, and that the hardware on which the second service and the third service are running are located on a same network.

7. A non-transitory computer-readable medium storing program code executable by a processing unit to cause a computing system to:
receive an incoming user request to an application, wherein the application comprises a first service and a second service;
in response to the incoming user request, transmit a first service call from the first service to the second service;
generate, at the second service, a response to the first service call;
determine an identifier of a type of hardware on which the second service is executing;
determine, at the second service, an amount of hardware resources consumed by the second service during generation of the response to the first service call;
generate, at the second service, a resource consumption token identifying the amount of hardware resources consumed by the second service during generation of the response to the first service call and the identifier of the type of hardware on which the second service is executing;
return the response to the first service call, and the resource consumption token to the first service;
generate, at the first service, a response to the incoming user request to an application based on the response to the first service call;
determine, at the first service, an amount of hardware resources consumed by the first service during generation of the response to the incoming user request;
determine a second identifier of a type of hardware on which the first service is executing;
generate a second resource consumption token at the first service based on the resource consumption token, the second resource consumption token including the identifier and the second identifier, and identifying the amount of hardware resources consumed by the first service during generation of the response to the incoming user request and the amount of resources identified by the resource consumption token; and
determine a resource cost associated with the incoming user request based on the second resource consumption token, a first cost model associated with the identifier of the type of hardware on which the second service is executing, and a second cost model associated with the second identifier of the type of hardware on which the first service is executing.

8. The medium according to claim 7, wherein determination of the resource cost comprises:
determination of the first cost model; and
determination of the second cost model associated with the second identifier.

9. The medium according to claim 7, the program code executable by a processing unit to cause a computing system to:
receive a third service call from the second service at a third service;
generate, at the third service, a response to the third service call;
determine, at the third service, an amount of hardware resources consumed by the third service during generation of the response to the third service call;
determine a third identifier of a type of hardware on which the third service is executing;
generate, at the third service, a third resource consumption token identifying the third identifier and the amount of hardware resources consumed by the third service during generation of the response to the third service call;
and
return the response to the third service call and the third resource consumption token to the second service,
wherein generation of the resource consumption token at the second service comprises determining that the identifier and the third identifier are identical, and, in response to the determination that the identifier and the third identifier are identical:
aggregate the amount of hardware resources consumed by the second service during generation of the response to the first service call with the amount of hardware resources consumed by the third service during generation of the response to the third service call,
wherein the resource consumption token identifies the aggregated amounts of hardware resources.

10. The medium according to claim 9, wherein determination of the resource cost comprises:
determination of the first cost model; and
determination of the second cost model.

11. The medium according to claim 10, wherein generation of the resource consumption token at the second service comprises determination that the identifier and the third identifier are identical and that the hardware on which the second service and the third service are running are located in a same region.

12. A system comprising:
a first hardware system of a first hardware type, comprising:
a first one or more processing units; and
a first memory storing program code executable by the first one or more processing units to cause the first hardware system to:
receive a first service call from a first service in response to an incoming user request to an application, wherein the application comprises the first service and a second service;
execute the second service to generate a response to the first service call;
determine an amount of hardware resources of the first hardware system consumed during generation of the response to the first service call;
determine a first identifier of the first hardware type;
generate a first resource consumption token identifying the amount of hardware resources of the first hardware system consumed during generation of the response to the first service call and the first identifier of the first hardware type;
return the response to the first service call and the first resource consumption token to the first service; and
a second hardware system of a second hardware type, comprising:
a second one or more processing units; and
a second memory storing program code executable by the second one or more processing units to cause the second hardware system to:
execute the first service to generate a response to the incoming user request based on the response to the first service call;
determine an amount of hardware resources of the second hardware system consumed during generation of the response to the incoming user request;
determine a second identifier of a second hardware type;
generate a second resource consumption token at the first service based on the first resource consumption token, the second resource consumption token including the identifier and the second identifier, and identifying the amount of hardware resources of the second hardware system consumed during generation of the response to the incoming user request and the amount of resources identified by the first resource consumption token; and
determine a resource cost associated with the incoming user request based on the second resource consumption token, a first cost model associated with the first identifier, and a second cost model associated with the second identifier.

13. The system according to claim 12, further comprising:
a third hardware system, comprising:
a third one or more processing units; and
a third memory storing program code executable by the third one or more processing units to cause the third hardware system to:
determine the first cost model; and
determine the second cost model.

14. The system according to claim 12, further comprising: a third hardware system of the first hardware type comprising: a third one or more processing units; and a third memory storing program code executable by the third one or more processing units to cause the third hardware system to: receive a third service call from the second service; generate a response to the third service call; determine an amount of hardware resources of the third hardware system consumed by the third service during generation of the response to the third service call; determine a third identifier of a type of hardware on which the third service is executing; generate a third resource consumption token identifying the third identifier and the amount of hardware resources of the third hardware system consumed during generation of the response to the third service call; return the response to the third service call; and the third resource consumption token to the second service, wherein generation of the first resource consumption token comprises aggregation of the amount of hardware resources consumed by the first hardware system during generation of the response to the first service call with the amount of hardware resources consumed by the third hardware system during generation of the response to the third service call, and wherein the first resource consumption token identifies the aggregated amounts of hardware resources.

15. The system according to claim 14, further comprising:
a fourth hardware system, comprising:
a fourth one or more processing units; and
a fourth memory storing program code executable by the third one or more processing units to cause the third hardware system to:
determine the first cost model; and
determine the second cost model.

16. The system according to claim 15, wherein generation of the first resource consumption token comprises determination that the first hardware system and the third hardware system are located in a same region.

17. The system according to claim 16, wherein generation of the first resource consumption token comprises determination that the first hardware system and the third hardware system are located in a same region, and that the first hardware system and the third hardware system are located on a same network.

* * * * *